US005872946A

United States Patent [19]
Narayan et al.

[11] Patent Number: 5,872,946
[45] Date of Patent: Feb. 16, 1999

[54] INSTRUCTION ALIGNMENT UNIT EMPLOYING DUAL INSTRUCTION QUEUES FOR HIGH FREQUENCY INSTRUCTION DISPATCH

[75] Inventors: Rammohan Narayan; Venkateswara Rao Madduri, both of Austin, Tex.

[73] Assignee: Advanced Micro Devices, Inc.

[21] Appl. No.: 873,339

[22] Filed: Jun. 11, 1997

[51] Int. Cl.[6] .................................................. G06F 9/312
[52] U.S. Cl. .............................................................. 395/380
[58] Field of Search ............................................. 395/380

[56] References Cited

U.S. PATENT DOCUMENTS

| | | |
|---|---|---|
| 4,044,338 | 8/1977 | Wolf . |
| 4,453,212 | 6/1984 | Gaither et al. . |
| 4,807,115 | 2/1989 | Torng . |
| 4,858,105 | 8/1989 | Kuriyama et al. . |
| 4,928,223 | 5/1990 | Dao et al. . |
| 5,053,631 | 10/1991 | Perlman et al. . |
| 5,058,048 | 10/1991 | Gupta et al. . |
| 5,123,097 | 6/1992 | Joyce et al. ............................. 395/394 |
| 5,129,067 | 7/1992 | Johnson . |
| 5,136,697 | 8/1992 | Johnson . |
| 5,226,126 | 7/1993 | McFarland et al. . |
| 5,226,130 | 7/1993 | Favor et al. . |
| 5,453,927 | 9/1995 | Matsuo ..................................... 395/582 |
| 5,509,137 | 4/1996 | Itomitsu et al. ........................ 711/168 |
| 5,600,806 | 2/1997 | Brown et al. . |
| 5,644,699 | 7/1997 | Yoshida .............................. 399/182.05 |
| 5,701,448 | 12/1997 | White ...................................... 395/580 |

FOREIGN PATENT DOCUMENTS

| | | |
|---|---|---|
| 0259095 | 3/1988 | European Pat. Off. . |
| 0 380 854 A2 | 8/1990 | European Pat. Off. . |
| 0381471 | 8/1990 | European Pat. Off. . |
| 0459232 | 12/1991 | European Pat. Off. . |
| 0 651 324 A1 | 5/1995 | European Pat. Off. . |
| 0 498 654 A2 | 8/1998 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," pp. 2–1 through 2–4.
Michael Slater, "AMD's K5 Designed to Outrun Pentium," Microprocessor Report, vol. 8, No. 14, Oct. 24, 1994, 7 pages.
Sebastian Rupley and John Clyman, "P6: The Next Step?," PC Magazine, Sep. 12, 1995, 16 pages.
Tom R. Halfhill, "AMD K6 Takes On Intel P6," BYTE, Jan. 1996, 4 pages.

*Primary Examiner*—William M. Treat
*Attorney, Agent, or Firm*—Conley, Rose & Tayon, PC; B. Noel Kivlin; Lawrence J. Merkel

[57] ABSTRACT

A microprocessor includes an instruction alignment unit for locating instructions and conveying the located instructions to a set of decode units. The instruction alignment unit includes dual instruction queues. The first instruction queue receives instruction blocks fetched from the instruction cache. The instruction alignment unit uses instruction identification information provided by the instruction cache to select instructions from the first instruction queue for conveyance to the second instruction queue. Additionally, the instruction alignment unit applies a predetermined selection criteria to the instructions within the second instruction queue in order to select instructions for dispatch to the decode units. Selection logic for the first instruction queue need not consider the type of instruction, etc., in selecting instructions for conveyance to the second instruction queue. Selection logic for the second instruction queue considers instruction type, etc., in determining which instructions to dispatch.

21 Claims, 7 Drawing Sheets

INSTRUCTION ALIGNMENT UNIT EMPLOYING DUAL INSTRUCTION QUEUES FOR HIGH FREQUENCY INSTRUCTION DISPATCH

BACKGROUND OF THE INVENTION

1. Field of the Invention

This invention relates to the field of microprocessors and, more particularly, to instruction alignment mechanisms within microprocessors.

2. Description of the Related Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

Microprocessor designers often design their products in accordance with the x86 microprocessor architecture in order to take advantage of its widespread acceptance in the computer industry. Because the x86 microprocessor architecture is pervasive, many computer programs are written in accordance with the architecture. X86 compatible microprocessors may execute these computer programs, thereby becoming more attractive to computer system designers who desire x86-capable computer systems. Such computer systems are often well received within the industry due to the wide range of available computer programs.

The x86 microprocessor specifies a variable length instruction set (i.e. an instruction set in which various instructions employ differing numbers of bytes to specify that instruction). For example, the 80386 and later versions of x86 microprocessors employ between 1 and 15 bytes to specify a particular instruction. Instructions have an opcode, which may be 1–2 bytes, and additional bytes may be added to specify addressing modes, operands, and additional details regarding the instruction to be executed.

Unfortunately, having variable byte length instructions creates numerous problems for dispatching multiple instructions per clock cycle. Because the instructions have differing numbers of bytes, an instruction may begin at any memory address. Conversely, fixed length instructions typically begin at a known location. For example, a 4 byte fixed length instruction set has instructions which begin at 4 byte boundaries within memory (i.e. the two least significant bits are zeros for the memory addresses at which instructions begin).

In order to locate multiple variable byte length instructions during a clock cycle, instruction bytes fetched by the microprocessor may be serially scanned to determine instruction boundaries and thereby locate instructions which may be concurrently dispatched. Serial scanning involves a large amount of logic, and typically a large number of cascaded logic levels. For high frequency (i.e. short clock cycle time) microprocessors, large numbers of cascaded logic levels may be deleterious to the performance of the microprocessor. Some microprocessor designs employ predecoding to identify the beginning and end of instructions as the instructions are stored into an instruction cache within the microprocessor. Even with predecoding, locating and dispatching multiple instructions per clock cycle is a complex and often clock-cycle-limiting operation. Multiple levels of multiplexing are employed, and significant bussing between the multiplexors and the instruction bytes being dispatched is needed to allow arbitrary selection of bytes from the instruction bytes being examined for dispatch. The first instruction to be dispatched may be located anywhere within the instruction bytes. The second instruction to be dispatched is then located at the end of the first instruction, etc.

SUMMARY OF THE INVENTION

The problems outlined above are in large part solved by a microprocessor in accordance with the present invention. The microprocessor described herein includes an instruction alignment unit for locating instructions and conveying the located instructions to a set of decode units. The instruction alignment unit includes dual instruction queues. The first instruction queue receives instruction blocks fetched from the instruction cache. The instruction alignment unit uses instruction identification information provided by the instruction cache to select instructions from the first instruction queue for conveyance to the second instruction queue. Additionally, the instruction alignment unit applies a predetermined selection criteria to the instructions within the second instruction queue in order to select instructions for dispatch to the decode units. Advantageously, the location of variable byte length instructions within the instruction block is separated from the application of the predetermined selection criteria. Selection logic for the first instruction queue may not consider the type of instruction, etc., in selecting instructions for conveyance to the second instruction queue. Instead, the selection logic may focus on quickly locating the first instructions (in program order) within the queued instruction blocks. Selection logic for the second instruction queue may then consider instruction type, etc., in determining which instructions to dispatch. Therefore, the dual byte queue instruction alignment unit may support a high frequency implementation.

In addition, since the second instruction queue is refilled upon dispatch of instructions by the first instruction queue, a relatively large number of instructions may be available for dispatch from the second byte queue in any given clock cycle. In other words, the bandwidth of instructions dispatched from the instruction alignment unit may be high. Therefore, a high bandwidth, high frequency instruction alignment unit may be realized by employing the dual instruction queue implementation described herein.

Broadly speaking, the present invention contemplates an instruction alignment unit comprising a first instruction queue, a second instruction queue, and a first control unit. Coupled to receive a plurality of instruction blocks, the first instruction queue is configured to store the plurality of instruction blocks. The second instruction queue is coupled to receive a plurality of instruction identifiers corresponding to a plurality of instructions from the first instruction queue. The second instruction queue is configured to store the plurality of instruction identifiers. Coupled to the first instruction queue and the second instruction queue, the first control unit is configured to select the plurality of instructions from the plurality of instruction blocks. Additionally, the first control unit is configured to select a number of the plurality of instructions based upon a number of instructions stored in the second instruction queue.

The present invention further contemplates a method for aligning instructions from an instruction cache to a plurality of decode units in a superscalar microprocessor. A plurality of instruction blocks is received from the instruction cache into a first instruction queue. A plurality of instructions are selected from the plurality of instruction blocks. The plurality of instructions are stored into a second instruction queue. One or more instructions from the second instruction queue are selected for dispatch to the plurality of decode units.

Moreover, the present invention contemplates a superscalar microprocessor comprising an instruction cache, an instruction alignment unit, and a plurality of decode units. The instruction cache is configured to store instructions and is further configured to provide a plurality of instruction blocks in response to instruction fetching. Coupled to the instruction cache to receive the plurality of instruction blocks, the instruction alignment unit is configured to store the plurality of instruction blocks into a first instruction queue. Additionally, the instruction alignment unit is configured to select a plurality of instructions from instruction blocks stored in the first instruction queue and to store the plurality of instructions in a second instruction queue. Still further, the instruction alignment unit is configured to select one or more instructions from the instructions stored in the second instruction queue for dispatch based upon a predefined selection criteria. Coupled to receive the one or more instructions from the instruction alignment unit, each one of the plurality of decode units is configured to receive a different one of the one or more instructions and to decode the received instruction.

BRIEF DESCRIPTION OF THE DRAWINGS

Other objects and advantages of the invention will become apparent upon reading the following detailed description and upon reference to the accompanying drawings in which.

Figure 1:
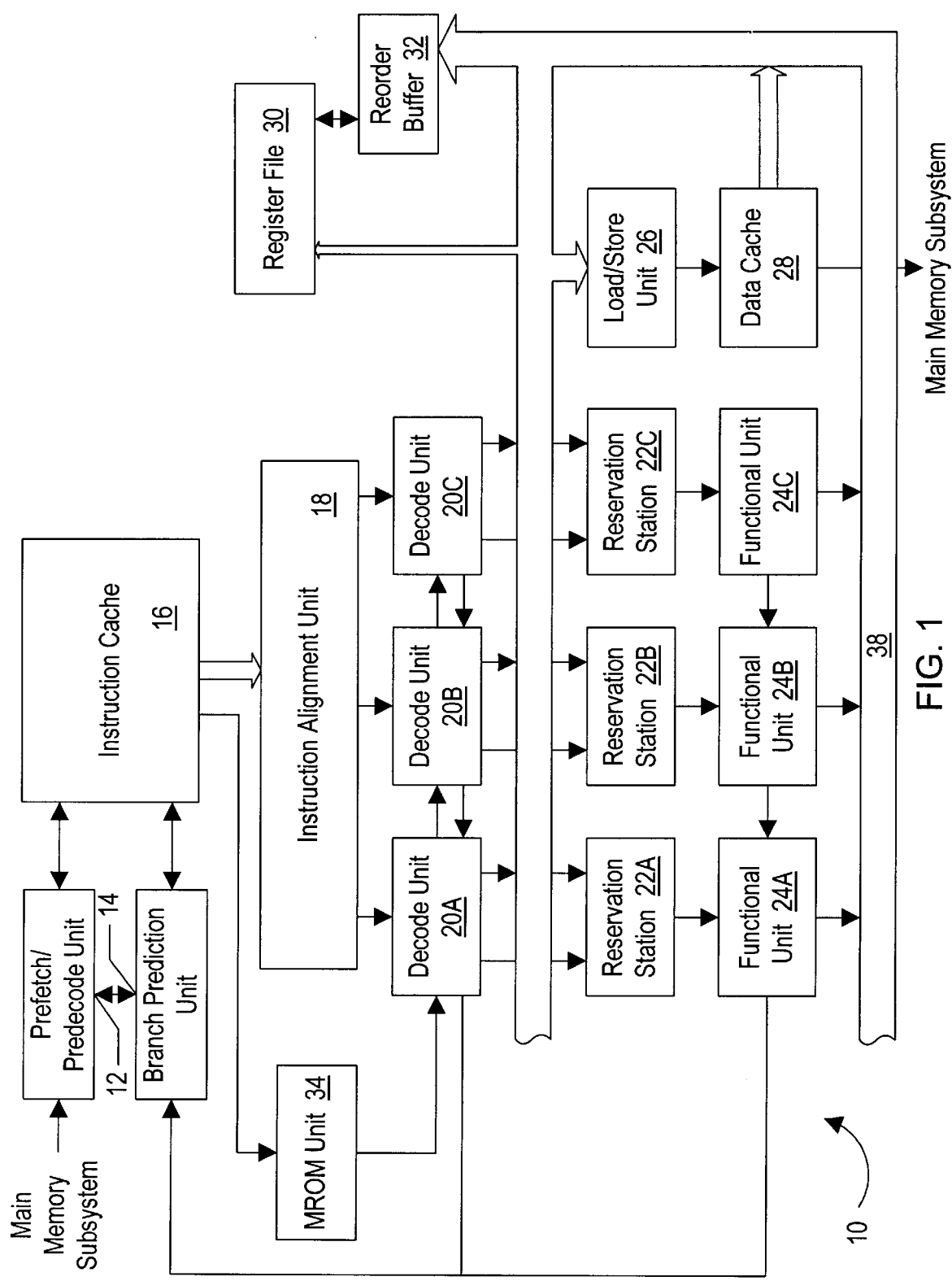
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Generally speaking, instruction alignment unit 18 is configured to receive instruction blocks from instruction cache 16 and to align instructions from the instruction blocks to decode units 20. Instruction alignment unit 18 employs a first byte queue for storing the instruction blocks. Instruction alignment unit 18 selects instructions from the byte queue and stores them into a second byte queue. Based upon predetermined selection criteria, instruction alignment unit 18 selects one or more instructions from the second byte queue for conveyance to decode units 20. Advantageously, the relatively large number of instructions available in the instruction blocks is reduced to a smaller number of instructions via the first stage of selection from the first byte queue into the second byte queue. Because the second byte queue stores a smaller number of instructions, the selection criteria for selecting instructions for dispatch to the decode units 20 may be applied even in a high frequency implementation. Additionally, the selection criteria may be more complex, thereby allowing more instructions to be selected for concurrent dispatch than selection criteria applied to a larger number of instructions. Multiple instructions may thereby be identified for dispatch.

An instruction block, as used herein, comprises a fixed number of bytes within which up to a maximum number of instructions per block are identified. A particular instruction block may include fewer instructions than the maximum number of instructions per block within its fixed number of bytes. Alternatively, a given fixed number of bytes within instruction cache 16 may include more instructions than the maximum number of instructions per block. In the latter case, two or more instruction blocks are formed from the given fixed number of bytes. Each instruction block includes the fixed number of bytes but identifies different instructions within the fixed number of bytes as comprising the instruction block. The fixed number of bytes are aligned to a boundary of the fixed number of bytes. In one embodiment, instruction blocks comprise eight bytes aligned on an eight byte boundary and the maximum number of instructions per block is three. The maximum number of instructions per block is selected because the average length of an x86 instruction is three bytes. Therefore, each eight bytes of instruction code includes 2⅔ instructions on average. It is noted that the maximum number of instructions per block may be varied in various embodiments as a matter of design choice.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in a 4 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

Start bits 10000
End bits 00001
Functional bits 11000

According to one particular embodiment, early identifying that an instruction includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by a single decode unit 20A–20C and for execution by a single functional unit 24A–24C. MROM instructions may be an example of microcode instructions. Generally, microcode instructions are instructions which are separated by a microcode unit (e.g. MROM unit 34) into two or more instructions, each of which may be decode by a single decode unit 20A–20C and executed by a corresponding functional unit 24A–24C. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
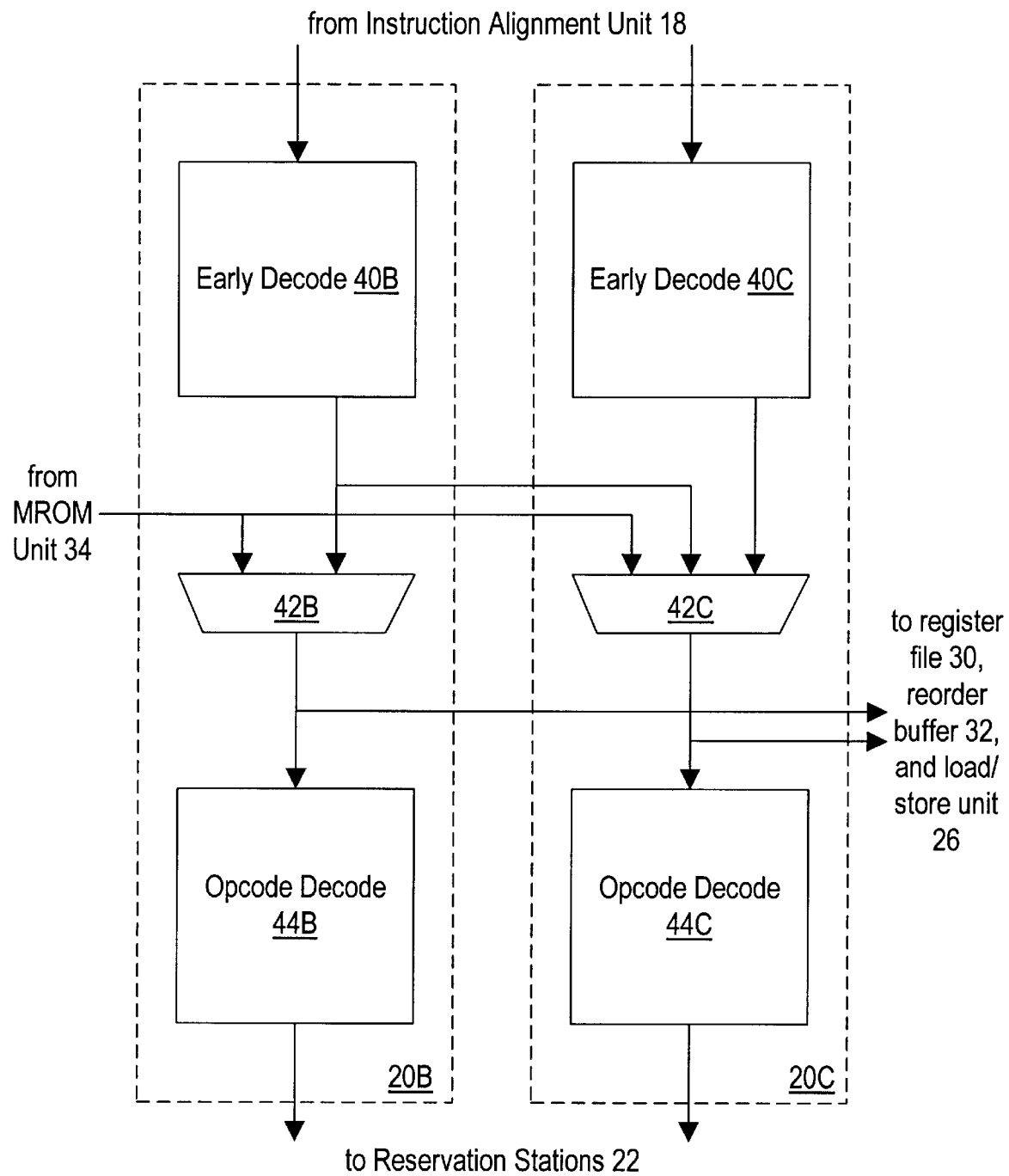
FIG. 2 is a block diagram of one embodiment of a pair of decode units shown in FIG. 1.

Turning now to FIG. 2, a block diagram of one embodiment of decode units 20B and 20C is shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexor 42B, and opcode decode unit 44B. Similarly, decode unit 20C includes early decode unit 40C, multiplexor 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42B is included for selecting between the instructions provided by MROM unit 34 and by early decode unit 40B. During times in which MROM unit 34 is dispatching instructions, multiplexor 42B selects instructions provided by MROM unit 34. At other times, multiplexor 42B selects instructions provided by early decode unit 40B. Similarly, multiplexor 42C selects between instructions provided by MROM unit 34, early decode unit 40B, and early decode unit 40C. The instruction from MROM unit 34 is selected during times in which MROM unit 34 is dispatching instructions. During times in which the early decode unit within decode unit 20A (not shown) detects a double dispatch instruction, the instruction from early decode unit 40B is selected by multiplexor 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;

(ii) decode unconditional branch instructions (which may include the unconditional jump, the CALL, and the RETURN) which were not detected during branch prediction;

(iii) decode source and destination flags;

(iv) decode the source and destination operands which are register operands and generate operand size information; and (v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 3:
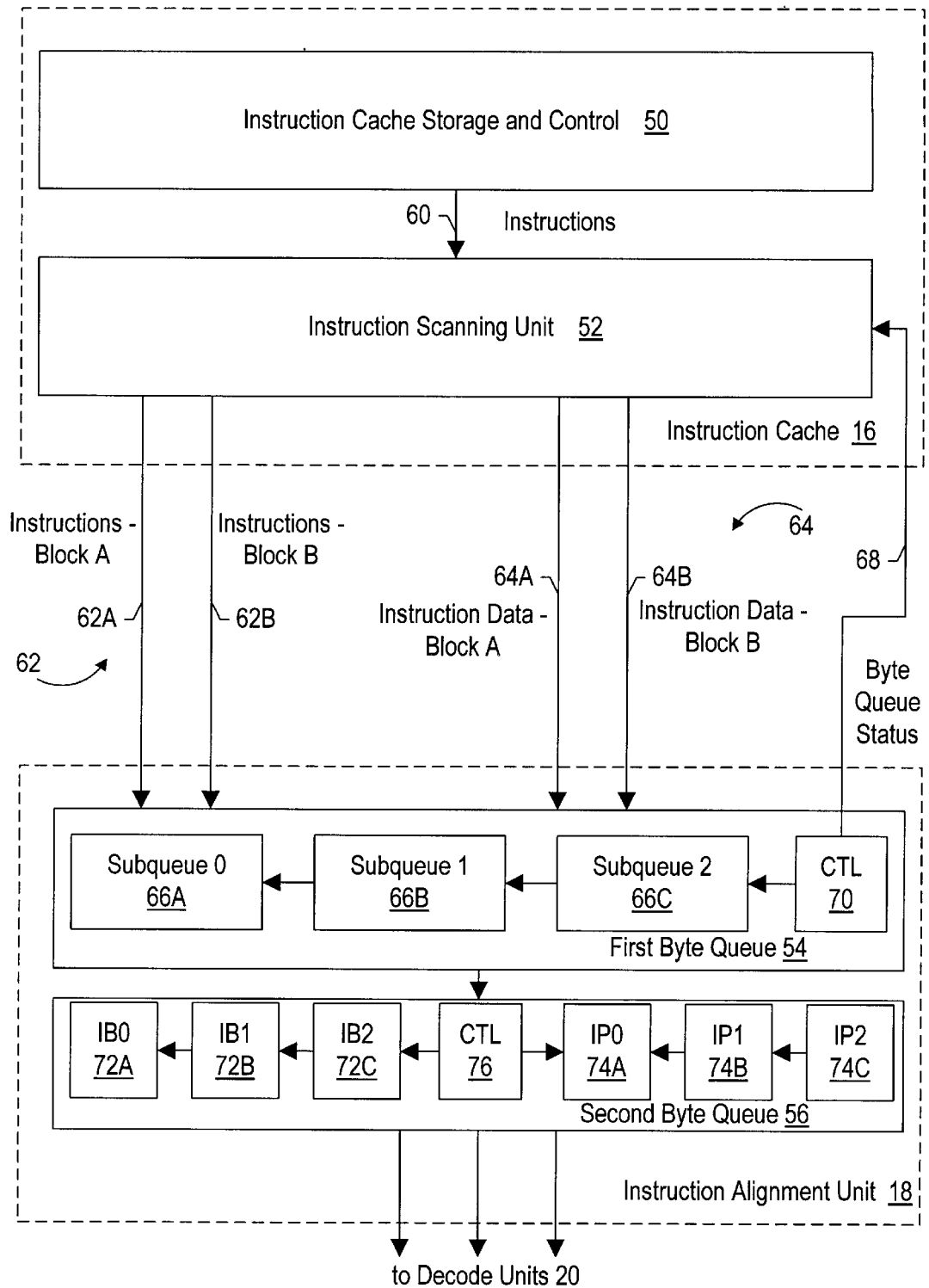
FIG. 3 is a block diagram of one embodiment of an instruction cache and an instruction alignment unit shown in FIG. 1.

Turning now to FIG. 3, a block diagram of one embodiment of instruction cache 16 and instruction alignment unit 18 is shown. Instruction cache 16 includes an instruction cache storage and control block 50 and an instruction scanning unit 52. Instruction alignment unit 18 includes a first byte queue 54 and a second byte queue 56.

Instruction cache storage and control block 50 includes storage for instruction cache lines and related control circuitry for fetching instructions from the storage, for selecting cache lines to discard when a cache miss is detected, etc. Instruction cache storage and control block 50 receives fetch addresses from branch prediction unit 14 (shown in FIG. 1) in order to fetch instructions for execution by microprocessor 10. Instruction bytes fetched from instruction cache storage and control block 50 are conveyed to instruction scanning unit 52 upon an instructions bus 60. Instruction bytes are conveyed upon instructions bus 60, as well as corresponding predecode data (e.g. start, end, and functional bits). In one embodiment, sixteen bytes stored in contiguous memory locations are conveyed upon instructions bus 60 along with the corresponding predecode data. The sixteen bytes form either the upper or lower half of the 32 byte cache line employed by instruction cache 16 according to the present embodiment. The upper half of the cache line is the half stored in memory addresses having larger numerical values, while the lower half is stored in memory addresses having smaller numerical values. Additionally, instruction scanning unit 52 receives information regarding the bytes within the sixteen bytes which are to be conveyed as instructions to instruction alignment unit 18. Instruction bytes at the beginning of the sixteen bytes may be ignored if the bytes are fetched as the target of a branch instruction, and the target address identifies a byte other than the first byte of the sixteen bytes. Additionally, if a branch instruction is within the sixteen bytes and branch prediction unit 14 predicts the branch taken, then bytes subsequent to the branch instruction within the sixteen bytes are ignored.

Instruction scanning unit 52 scans the predecode data associated with the bytes which are to be conveyed as instructions to instruction alignment unit 18. Instruction scanning unit 52 divides the sixteen bytes conveyed by instruction cache storage and control block 50 into two portions comprising eight contiguous bytes each. One portion forms the lower half of the sixteen bytes (i.e. the bytes stored at smaller numerical addresses than the bytes forming the upper half of the sixteen bytes). The other portion forms the upper half of the sixteen bytes. Therefore, an eight byte portion forms one of four quarters of the 32 byte cache line employed by instruction cache storage and control block 50, according to the present embodiment. As used herein, bytes are contiguous if they are stored in contiguous memory locations in the main memory subsystem. It is noted that particular sizes of various components are used herein for clarity of the description. Any size may be used for each component within the spirit and scope of the appended claims.

Instruction scanning unit 52 scans the predecode data of each portion of the instruction bytes independently and in parallel. These portions scanned by scanning unit 52 comprise the fixed number of bytes defined to be an instruction block. Instruction scanning unit 52 therefore scans the predecode data to identify up to the maximum number of instructions per block.

The instruction bytes and instruction identification information generated by instruction scanning unit 52 are conveyed to first byte queue 54 upon an instructions bus 62 and an instruction data bus 64, respectively. As shown in FIG. 3, instructions bus 62 includes an instructions—block A bus 62A and an instructions—block B bus 62B. Instructions—block A bus 62A conveys the instruction bytes corresponding to the first instruction block being scanned by instruction scanning unit 52 (in program order). Similarly, instructions—block B bus 62B conveys the instruction bytes corresponding to the second instruction block being scanned by instruction scanning unit 52.

Instruction identification information corresponding to the instruction bytes conveyed upon instructions—block A bus 62A is conveyed upon instruction data—block A bus 64A. Similarly, instruction identification information corresponding to the instruction bytes conveyed upon instructions—block B bus 62B is conveyed upon instruction data—block B bus 64B. Instruction data—block A bus 64A and instruction data—block B bus 64B comprise instruction data bus 64 as shown in FIG. 3. Each eight byte portion and the corresponding instruction identification information forms an instruction block.

First byte queue 54 receives the instruction blocks conveyed and stores them into one of multiple subqueues included therein. In the embodiment shown, first byte queue 54 includes three subqueues: a first subqueue 66A, a second subqueue 66B, and a third subqueue 66C. First subqueue 66A stores the instruction block which is foremost among the instruction blocks stored in first byte queue 54 in program order. Second subqueue 66B stores the instruction block which is second in program order, and third subqueue stores the instruction block which is third in program order.

If a particular eight byte portion as scanned by instruction scanning unit 52 includes more than the maximum number of instructions per block, then the particular eight byte portion is retained by instruction scanning unit 52. During the following clock cycle, the particular eight byte portion is scanned again. The predecode data corresponding to the previously identified instructions included within the previously dispatched instruction block is invalidated such that instruction scanning unit 52 detects the additional instructions. If the other eight byte portion concurrently received with the particular eight byte portion is subsequent to the particular eight byte portion in program order, then the other eight byte portion is rescanned as well. First byte queue 54 discards the instruction block received from the other eight byte portion, in order to retain program order among the instruction blocks stored in the byte queue.

A control unit 70 within first byte queue 54 conveys a byte queue status upon byte queue status bus 68 to instruction scanning unit 52. Byte queue status bus 68 includes a signal corresponding to each subqueue 66. The signal is asserted if the subqueue 66 is storing an instruction block, and deasserted if the subqueue 66 is not storing an instruction block. In this manner, instruction scanning unit 52 may determine how many instruction blocks are accepted by first byte queue 54 during a clock cycle. If two instruction blocks are conveyed during a clock cycle and only one instruction block is accepted, instruction scanning unit 52 retains the rejected instruction block and rescans the instruction block in the subsequent clock cycle.

As noted above, an instruction block may contain up to a maximum number of instructions (e.g. three in the present embodiment). Additionally, eight contiguous bytes are conveyed for each instruction block. However, due to the variable byte length of the x86 instructions, an instruction may begin within one set of eight contiguous bytes and end in another set of eight contiguous bytes. Such an instruction is referred to as an overflow instruction. If an overflow instruction is detected, it is identified as the last of the maximum number of instructions. Instead of being indicated as a valid instruction within the instruction block, the overflow instruction is identified as an overflow. Instruction identification information is generated, but the instruction is handled somewhat differently, as will be explained in more detail below.

In one embodiment, the instruction identification information for each instruction includes: (i) start and end pointers identifying the bytes at which the identified instruction begins and ends within the instruction block; (ii) a valid mask including a bit for each of the bytes within the instruction block; (iii) a bit indicative of whether the instruction is MROM or fast path; (iv) an instruction valid bit indicating that the instruction is valid; and (v) an overflow bit for the last instruction indicating whether or not it is an overflow. The valid mask includes a binary one bit corresponding to each byte included within the particular instruction (i.e. the bits between the start pointer and end pointer, inclusive, are set). Zero bits are included for the other bytes.

Additional information conveyed with the instruction identification information includes the taken/not taken prediction if the instruction is a branch instruction, bits indicating which of the quarters of the 32 byte cache line the eight bytes correspond to, the functional bits from the predecode data corresponding to the eight bytes, and a segment limit identifying the segment limit within the eight bytes for exception handling. The additional information is provided by instruction cache storage and control block 50 except for the branch prediction, which is provided by branch prediction unit 14.

Control unit 70 examines the instruction identification information stored in the subqueues 66 to select instructions from first byte queue 54. Control unit 70 selects a number of instructions for conveyance to second byte queue 56 depending upon the number of instructions currently stored in the second byte queue, and the number of instruction blocks containing those instructions. Generally, control unit 70 selects as many instructions as possible for conveyance to second byte queue 56 based upon the available storage within second byte queue 56 for instruction blocks and instructions. In other words, control unit 70 selects a number of instructions which either fill instruction position storages 74 or the corresponding instruction blocks which are not already stored in instruction bytes storages 72 fill instruction bytes storages 72.

Second byte queue 56 includes a plurality of instruction bytes storages 72A–72C, a plurality of instruction position storages 74A–74C, and a control unit 76. Each instruction bytes storage 72 is configure to store the instruction bytes comprising an instruction block. Therefore, in the embodiment shown, second byte queue 56 may concurrently store instructions which are drawn from up to three different instruction blocks. Each instruction position storage is configured to store an instruction identifier corresponding to one instruction. Generally speaking, an "instruction identifier" is information which locates a particular instruction within instruction bytes storages 72A–72C. The information can be used to select the instruction bytes which comprise the instruction from instruction bytes storage 72A–72C. Therefore, in the embodiment shown, second byte queue 56 may concurrently store instruction identifiers for up to three instructions within the instruction bytes stored in instruction bytes storages 72.

Control unit 76 is configured to select instructions from second byte queue 56 for conveyance to decode units 20. The instruction represented within each instruction position storage 74 is dispatched to a corresponding decode unit 20, subject to a selection criteria employed by control unit 76. Generally, the instruction represented within instruction position storage 74A may be dispatched to decode unit 20A during a clock cycle (assuming no pipeline stalls from decode units 20 or subsequent pipeline stages). If control unit 76 determines that the instruction represented within instruction position storage 74B may be concurrently dispatched with the instruction represented within instruction position storage 74A, then the instruction may be dispatched to decode unit 20B. Similarly, if control unit 76 determines that the instruction represented within instruction position storage 74C may be concurrently dispatched with the instructions represented within instruction position storages 74A–74B, then the instruction may be dispatched to decode unit 20C. Upon dispatching one or more instructions, control unit 76 causes the information within instruction position storages 74A–74C to be shifted into adjacent instruction position storages 74A–74B, thereby allowing for additional instructions to be conveyed from first byte queue 54 into second byte queue 56 while maintaining the identified instructions in program order.

According to one embodiment, the selection criteria employed by control unit 76 is as follows:

(i) instructions are dispatched in program order;

(ii) up to three fast path instructions can be concurrently dispatched;

(iii) an MROM instruction can be dispatched if a synchronization signal from MROM unit 34 is asserted indicating that MROM unit 34 is ready to dispatch an MROM instruction;

(iv) an MROM instruction being dispatched to decode unit 20A may concurrently be dispatched with a fast path instruction to decode position 20B and vice-versa (referred to as "packing"—see further discussion below);

(v) at most one MROM instruction is dispatched concurrently;

(vi) an MROM instruction is not dispatched to decode unit 20C (a corollary to criterion (iv));

(vii) at most one predicted taken branch is concurrently dispatched; and (viii) instructions from at most two cache lines are concurrently dispatched (each cache line is represented by an address in reorder buffer 32, and reorder buffer 32 employs two locations for storing addresses for each set of concurrently dispatched instructions in the present embodiment).

As mentioned above, an MROM instruction and a fast path instruction can be "packed" together (i.e. concurrently dispatched). Some MROM instructions are parsed into two fast path instructions, thereby leaving a decode unit 20 available for the concurrent dispatch of a fast path instruction. If MROM unit 34 indicates that the MROM instruction to be dispatched is a two instruction MROM instruction, then control unit 76 selects both the MROM instruction and the adjacent fast path instruction for dispatch. Otherwise, the MROM instruction is dispatched during a different clock cycle than the adjacent fast path instruction. If no fast path instruction is adjacent to the MROM instruction, the MROM instruction is dispatched separate from other instructions regardless of whether or not the MROM instruction parses into two instructions or more than two instructions.

By using first byte queue 54 and second byte queue 56, the location of variable byte length instructions within the instruction blocks is separated from the dispatch of instructions to decode units 20A. These two operations are logically separate from each other and are generally serial in nature. Therefore, first byte queue 54 performs instruction location. Instruction identifiers locating the instructions are placed into instruction position storages 74. By first locating a small number of instructions which are eligible for dispatch and conveying these instructions to second byte queue 56, first byte queue 54 provides a smaller pool of instructions to which second byte queue 56 may apply the dispatch selection criteria. Since a relatively small number of instructions are examined, the selection criteria may be applied using a relatively small number of cascaded levels of logic. A high frequency implementation of instruction alignment may thereby be realized.

While the small pool of instructions stored by second byte queue 56 allows a high frequency implementation, the larger pool of instructions maintained by first byte queue 54 allows for more instructions to be fetched from instruction cache 16 during a given clock cycle than if second byte queue 56 were employed alone. Thus, first byte queue 54 may increase the average number of instructions dispatched during a given clock cycle by rapidly providing instructions into second byte queue 56 when instructions are dispatched. Advantageously, instruction alignment unit 18 may provide both a high bandwidth (i.e. instructions dispatched per clock cycle) and high frequency alignment of instructions to decode units 20.

It is noted that it may be advantageous to physically locate control units 70 and 76 near each other to facilitate high speed communications therebetween. In addition, it may be advantageous to duplicate control logic between control units 70 and 76 to lessen the communication signals employed between the control units.

It is noted that MROM instructions are identified by instruction scanning unit 52 as well. Instruction scanning unit 52 routes the MROM instructions to MROM unit 34. However, the MROM instructions may flow through instruction alignment unit 18 as well. In this manner, instruction alignment unit 18 may detect the MROM instruction and convey it to decode units 20. MROM unit 34 may then insert the corresponding instructions between early decode units 40 and opcode decode units 44 when the MROM instruction arrives in early decode units 40, as described above with respect to FIG. 2.

Control unit 70, upon detecting that all instructions within a given instruction block have been conveyed to second byte queue 56, shifts the contents of each subqueue 66B–66C into an adjacent subqueue 66A–66B. In this manner, the instruction block which has been exhausted of instructions is discarded and other instruction blocks are maintained in program order. Additionally, the instruction identification information within a subqueue 66 is shifted such that the first field within the subqueue 66 stores the first instruction (in program order) remaining within the subqueue. However, overflow instructions remain in the last field within the subqueue. Control unit 70 further allocates subqueues 66 for storing instruction blocks provided by instruction scanning unit 52.

Figure 4:
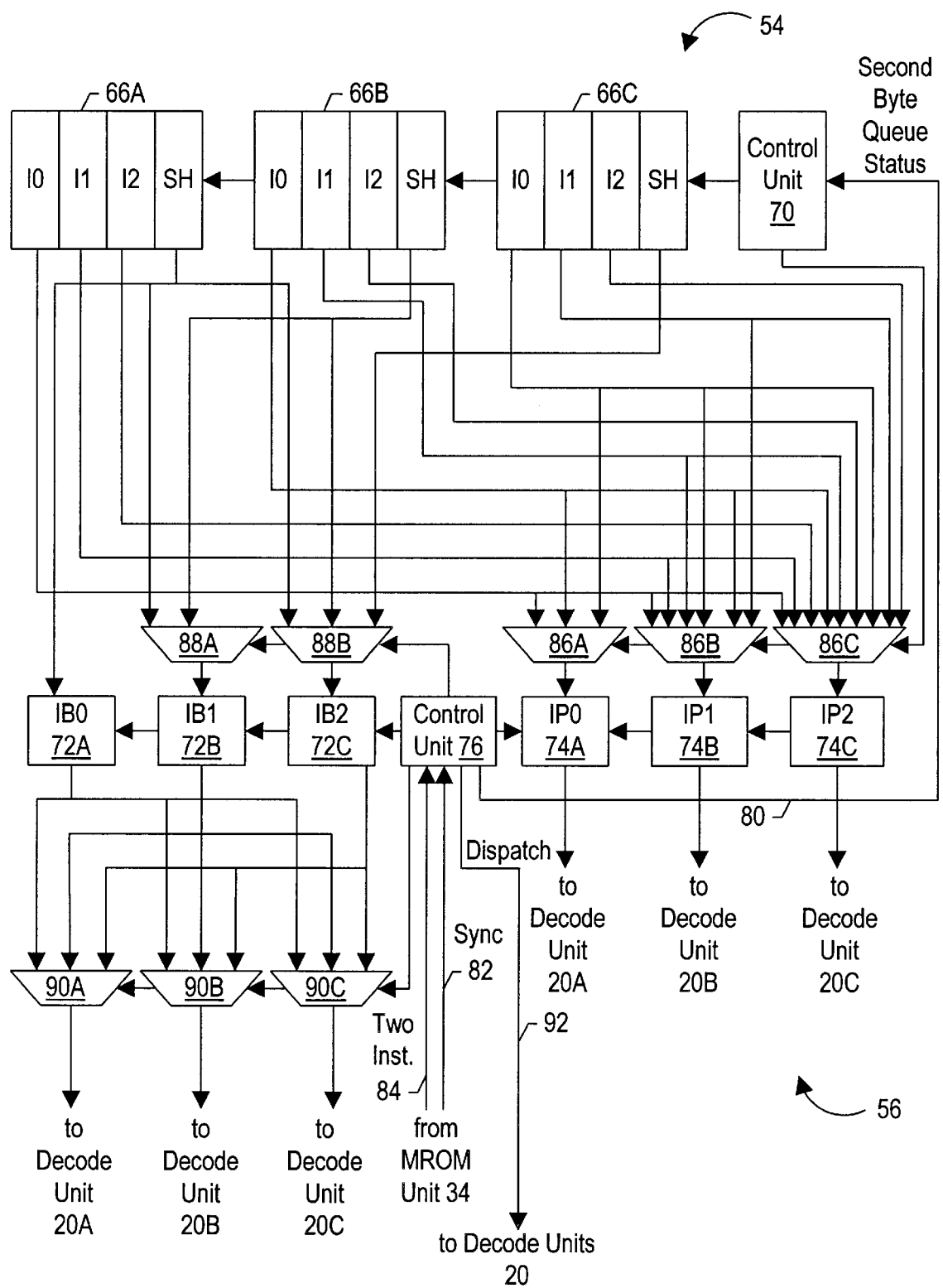
FIG. 4 is a more detailed block diagram illustrating one embodiment of the instruction alignment unit shown in FIG. 3.

Turning next to FIG. 4, a more detailed block diagram of one embodiment of first byte queue 54 and second byte queue 56 is shown. Each of subqueues 66 from first byte queue 54 are illustrated as having various fields, including a first instruction field (I0), a second instruction field (I1), and third instruction field (I2), and a shared field (SH). Each of the first instruction field, the second instruction field, and the third instruction field are configured to store instruction identification information corresponding to one instruction within the instruction block stored in that subqueue. The information stored in the instruction fields and the shared fields according to one embodiment of the subqueues is shown below. A second byte queue status bus 80 is coupled between control unit 76 and control unit 70. Additionally, control unit 76 is coupled to a sync line 82 and a two instructions line 84 from MROM unit 34. A plurality of instruction multiplexors 86A–86C are coupled between subqueues 66A–66C and instruction position storages 74A–74C. A plurality of instruction bytes multiplexors 88A–88B are coupled between subqueues 66A–66C and instruction bytes storages 72B–72C. Additionally, a plurality of output multiplexors 90A–90C are coupled between instruction bytes storages 72A–72C and decode units 20.

Control unit 70 is coupled to provide multiplexor selection controls to instruction multiplexors 86. Control unit 70 generates the multiplexor selection controls by scanning the instruction valid bits corresponding to the instruction fields within subqueues 66 and the information conveyed upon second byte queue status bus 80. Second byte queue status bus 80 indicates which of instruction position storages 74 and which of instruction bytes storages 72 are empty upon dispatching instructions during a particular clock cycle. For example, second byte queue status bus 80 may comprise a signal corresponding to each instruction position storage 74A–74C indicative, when asserted, that the corresponding instruction position storage 74 is storing an instruction subsequent to dispatch of instructions during the current clock cycle. Additionally, second byte queue status bus 80 may be include a signal corresponding to each instruction byte storage 72A–72C indicative, when asserted, that the corresponding instruction bytes storage 72 is storing a block of instruction bytes subsequent to instruction dispatch during the current clock cycle.

Control unit 70 selects as many instructions as possible from subqueues 66 to fill instruction position storages 74. Control unit 70 also considers availability of instruction bytes storages 72 in selecting instructions. Generally, control unit 70 selects a number of instructions for instruction position storages 74 which either fills instruction position storages 74 or fills instruction bytes storages 72. Control unit 70 considers the validity of instructions within subqueues 66A–66C in selecting instructions for instruction position storages 74. Advantageously, the type of instruction (MROM or fast path) and other instruction properties stored in subqueues 66A–66C (such as whether or not an instruction is a predicted taken branch instruction, etc.) need not be considered by control unit 70 in selecting instructions to fill instruction position storages 74. The logic for performing the selection may be simplified, thereby allowing for a high frequency implementation.

As shown in FIG. 4, instruction multiplexor 86A is coupled to receive instruction information from the I0 instruction field of each subqueue 66A–66C. Since instruction position storage 74A stores the instruction which is first in program order, among instructions in instruction position storages 74A–74C, and since subqueues 66A are shifted such that the first instruction in program order is the instruction in field I0, instruction multiplexor 86A is connected to select from only the first instruction field of each subqueue 66A–66C. Similarly, instruction multiplexor 86B is coupled to select instruction information from either instruction fields I0 and I1. Instruction multiplexor 86B is coupled to select instruction information from any field within subqueues 66.

Instruction bytes storages 72 are coupled to receive blocks of instructions from subqueues 66 via instruction bytes multiplexors 88. Control unit 76 is coupled to provide selection controls for multiplexors 88 as shown in FIG. 4, but control unit 70 may provide selection controls as well. Instruction bytes storage 72 are maintained such that instruction bytes storage 72A stores a block of instruction bytes corresponding to instructions which are prior to instructions corresponding to blocks of instruction bytes in instruction bytes storages 72B and 72C. Similarly, instruction bytes storage 72B stores a block of instruction bytes corresponding to instructions which are prior to instructions corresponding to the block of instruction bytes in instruction bytes storage 72C. Therefore, if instruction bytes storage 72A receives a block of instruction bytes from subqueues 66, the block of instruction bytes is drawn from subqueue 66A. Blocks of instruction bytes in subqueues 66B and 66C are subsequent to the block of instruction bytes in subqueue 66A. Additionally, instruction bytes storage 72A may receive a block of instruction bytes shifted in from instruction bytes storage 72B. Similarly, instruction bytes storage 72A may receive a block of instruction bytes from subqueue 66A or subqueue 66B, while instruction bytes storage 72C may receive a block of instruction bytes from any subqueue 66.

For example, if instruction bytes storages 72A–72C are empty during a clock cycle, instruction bytes storage 72A may receive a block of instruction bytes from subqueue 66A; instruction bytes storage 72B may receive a block of instruction bytes from subqueues 66B; and instruction bytes storage 72C may receive a block of instruction bytes from subqueue 66C. On the other hand, if instruction bytes storage 72A is storing a block of instruction bytes during a clock cycle, instruction bytes storage 72B may receive a block of instruction bytes from subqueue 66A and instruction bytes storage 72C may receive a block of instruction bytes from subqueue 66B. Generally, a block of instruction bytes may be selected for storage into instruction bytes storages 72 via instruction bytes multiplexors 88, and a particular block of instruction bytes may be validated if an instruction within the particular block of instruction bytes is conveyed into instruction position storages 74.

Instruction identifiers stored in instruction position storages 74A–74C are directly conveyed to corresponding decode units 20A–20C. Control unit 76 signals which instructions have been selected for dispatch via a dispatch bus 92 coupled to decode units 20. If a decode unit 20A–20C receives an indication that the corresponding instruction is being dispatched, the decode unit 20 operates upon the received instruction information and corresponding instruction bytes selected via multiplexors 90. It is noted that, in the case of overflow instructions, instruction bytes from more than one of instruction bytes storages 72 may be selected by a given output multiplexor 90A–90C.

Control unit 76 receives synchronization signals from MROM unit 34 in order to dispatch MROM instructions. The sync signal upon sync line 82 indicates, when asserted, that MROM unit 34 is prepared to dispatch an MROM instruction. Control unit 76 does not select an MROM instruction for dispatch unless the sync signal is asserted. Control unit 76 asserts a similar sync signal to MROM unit 34 to indicate that the MROM instruction has been selected. Additionally, a two instruction line 84 carries an indication, when asserted, that the next MROM instruction to be dispatched translates into two fast path instructions. Control unit 76 uses the two instruction indication to determine if a fast path instruction can be concurrently dispatched with the MROM instruction.

It is noted that, although multiplexors 86, 88, and 90 as shown in FIG. 4 are individual multiplexors, the selection represented by each multiplexor may actually be performed by multiple multiplexors, arranged in cascade or in parallel.

Figure 5:
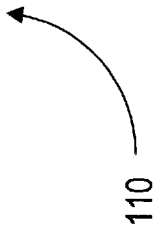
FIG. 5 is a diagram illustrating instruction identification information corresponding to one instruction within an instruction block according to one embodiment of the instruction alignment unit.

Turning now to FIG. 5, a diagram is shown depicting exemplary information stored in a field 110 of subqueues 66A–66C, according to one embodiment. For example, field 110 may be field I0, I1, or I2 for the first, second, or third instruction within an instruction block. Each field stores equivalent information regarding different instructions. Field 110 stores a valid indication 112, a start pointer 114, an end pointer 116, a valid mask 118, an MROM/fast path indication 120, and a branch prediction indication 122.

Valid indication 112 identifies the validity or invalidity of the remainder of the information stored in field 110. If the valid indication indicates validity, then instruction identification information is stored in field 110. If the valid indication indicates invalidity, then instruction identification information is not stored within field 110 (i.e. field 110 is empty). In one embodiment, valid indication 112 comprises a bit indicative, when set, that instruction identification information is stored within field 110. When clear, the bit indicates that instruction identification information is not stored within field 110.

Start pointer 114 and end pointer 116 locate the byte positions within the instruction block at which the instruction identified in field 110 begins and ends, respectively. For embodiments in which an instruction block includes 8 bytes, start pointer 114 and end pointer 116 each comprise three bit values indicating the numerical position between zero and seven of the respective start or end point. Valid mask 118 is a mask of zeros and ones. Each bit in the mask corresponds to one of the bytes within the instruction block. Bits in the mask corresponding to bytes not included within the instruction identified by field 110 are set to zero. Conversely, bits in the mask corresponding to bytes included within the instruction are set to one. For example, if the instruction identified by field 110 begins at the third byte within the instruction block and ends at the fifth byte within the instruction block, the start pointer is 010, the end pointer is 100, and the mask is 00111000 (all expressed in binary format). The start pointer, end pointer, and mask are used to generate selection controls for selecting bytes within the instruction block when the instruction is selected for issue.

MROM/fast path indication 120 indicates the MROM or fast path nature of the instruction identified by field 110. In one embodiment, indication 120 comprises a bit indicative, when set, that the instruction is an MROM instruction. When clear, the bit indicates that the instruction is a fast past instruction. Finally, branch prediction indication 122 comprises a bit indicative, when set, that the instruction is a branch instruction which is predicted taken. When clear, the bit indicates that the instruction is either not a branch instruction or is a branch instruction predicted not taken.

Figure 6:
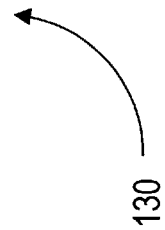
FIG. 6 is a diagram illustrating instruction identification information which is shared among the instructions within an instruction block according to one embodiment of the instruction alignment unit.

Turning now to FIG. 6, a diagram is shown depicting exemplary information stored in a shared field 130 of a subqueue 66A–66C. Information stored in shared field 130 is shared information valid for the entire instruction block, according to one embodiment. An address bits field 132, a functional bits field 134, a segment limit field 136, an overflow indication 138, and an instruction bytes field 140 are included. Address bits field 132 stores a pair of address bits which identify the quarter of the cache line from which the instruction block was fetched. Functional bits field 134 stores the original functional bits from the predecode data associated with the instruction bytes within the instruction block.

Segment limit field 136 is used to detect instructions being dispatched from outside the code segment. As will be appreciated by those skilled in the art, the x86 microprocessor architecture divides the memory space into segments. One of these segments is the code segment, from which instructions are fetched. The segment has a defined limit, which may be of arbitrary size. If instruction execution proceeds outside of the code segment, a segment limit violation exception is signalled. Microprocessor 10 may handle segment limit violations as follows: if an entire set of instructions fetched from instruction cache 16 during a clock cycle lies outside the code segment, the instructions are not conveyed to instruction alignment unit 18. Instead, the segment limit violation is signalled to reorder buffer 32 and to the control logic within instruction cache 16. The control logic generates a signal to MROM unit 34, causing MROM unit 34 to begin dispatching the exception service routine corresponding to the segment limit violation. If instructions prior to the segment limit violation retire successfully (as opposed to being discarded due to branch misprediction or other exception), then the exception may be taken at that time. However, the limit may be arbitrary and therefore may fall within the set of instructions fetched from instruction cache 16. Segment limit field 136 is included for handling this case. If the limit is crossed within the instruction block, then segment limit field 136 indicates which byte position represents the segment limit. In one embodiment, segment limit field 136 comprises four bits to indicate a limit at one of the sixteen bytes within the instruction cache line. If an instruction beyond the limit imposed by segment limit field 136 is dispatched, an exception is signalled to reorder buffer 32.

Overflow indication 138 indicates that one of the instructions within the instruction block overflows into the subsequent instruction block. Information regarding the overflowing instruction is stored in field I2 of the corresponding subqueue 66A–66C. In one embodiment, overflow indication 138 comprises a bit indicative, when set, that an instruction within the instruction block overflows. When clear, the bit indicates that no instruction within the instruction block overflows. If overflow indication 138 is set, then the valid indication within field I2 is clear. Alternatively, overflow indication 138 is clear if the valid indication within field I2 is set. In this manner, field I2 is indicated either to store an overflow instruction or a valid instruction ending within the instruction block, but not both. Additionally, field I2 is indicated to be not storing an instruction if both overflow indication 138 and the valid indication for position I2 are clear. Instruction bytes field 140 stores the actual instruction bytes included within the instruction block. In one embodiment, instruction bytes field 140 is eight bytes wide.

Figure 7:
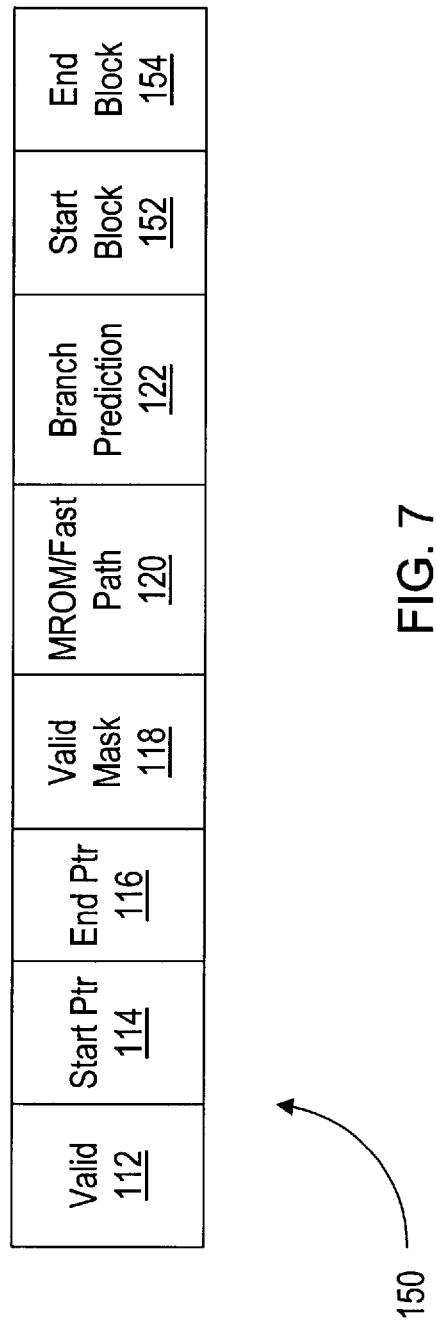
FIG. 7 is a diagram illustrating instruction identification information stored in an instruction position within a second byte queue according to one embodiment of the instruction alignment unit.

Turning next to FIG. 7, an exemplary instruction identifier 150 stored by one embodiment of instruction position storages 74 is shown. Other embodiments may employ different instruction identifiers than the embodiment shown in FIG. 7. As shown in FIG. 7, instruction identifier 150 includes valid indication 112, start pointer 114, end pointer 116, valid mask 118, MROM/fast path indication 120, and branch prediction 122 from the instruction field of the subqueue 66A–66C which stored the instruction when the instruction was conveyed into the instruction position storage 74.

Additionally, instruction identifier 150 includes a start block field 152 and an end block field 154. Start block field 152 identifies which of instruction bytes storages 72 stores the start byte of the instruction. Similarly, end block field 154 identifies which of instruction bytes storages 72 stores the end byte of the instruction. For non-overflow instructions, start block field 152 and end block field 154 store the same value. Using start block field 152, end block field 154, start pointer 114, and end pointer 116, control unit 76 may form select controls for output multiplexors 90.

Figure 8:
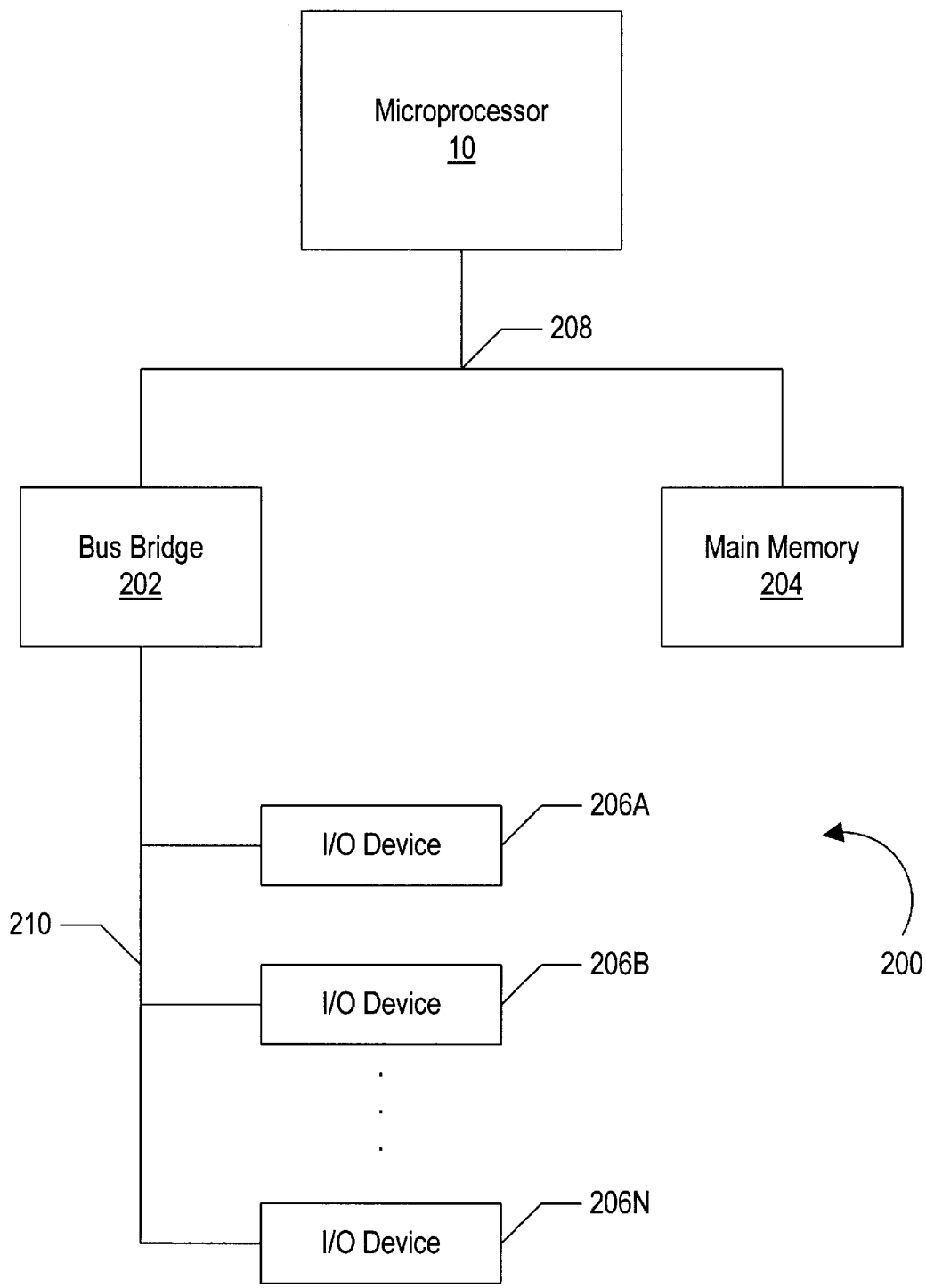
FIG. 8 is a block diagram of one embodiment of a computer system including the microprocessor shown in FIG. 1.

Turning now to FIG. 8, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 8 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration. It is still further noted that the functions of bus bridge 202, main memory 204, and the cache memory may be integrated into a chipset which interfaces to microprocessor 10.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1 x86 Fast Path, Double Dispatch, and MROM Instructions

| x86 Instruction | Instruction Category |
| --- | --- |
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSE | fast path |
| BSR | fast path |
| BSWAP | MROM |
| BT | fast path |
| BTC | fast path |
| BTR | fast path |
| BTS | fast path |
| CALL | fast path/double dispatch |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |

TABLE 1-continued x86 Fast Path, Double Dispatch, and MROM Instructions

| x86 Instruction | Instruction Category |
|---|---|
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | MROM |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | double dispatch |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

Note:
Instructions including an SIB byte are also considered double dispatch instructions.

In accordance with the above disclosure, a microprocessor has been shown which employs a dual byte queue for high speed instruction alignment of variable byte length instructions to a plurality of decode units. The dual byte queue approach may allow a high frequency implementation of the microprocessor, despite the complexity of locating and dispatching variable byte length instructions.

Numerous variations and modifications will become apparent to those skilled in the art once the above disclosure is fully appreciated. It is intended that the following claims be interpreted to embrace all such variations and modifications.

What is claimed is:

1. An instruction alignment unit comprising:
   a first instruction queue coupled to receive a plurality of instruction blocks, wherein said first instruction queue is configured to store said plurality of instruction blocks;
   a second instruction queue coupled to receive a plurality of instruction identifiers corresponding to a plurality of instructions from said first instruction queue, wherein said second instruction queue is configured to store said plurality of instruction identifiers; and
   a first control unit coupled to said first instruction queue and said second instruction queue, wherein said first control unit is configured to select said plurality of instructions from said plurality of instruction blocks, and wherein said first control unit is configured to select a number of said plurality of instructions based upon a number of instructions stored in said second instruction queue.

2. The instruction alignment unit as recited in claim 1 further comprising a second control unit coupled to said first instruction queue and said second instruction queue, wherein said second control unit is configured to select one or more of said plurality of instructions for dispatch.

3. The instruction alignment unit as recited in claim 2 wherein said second instruction queue comprises a plurality of instruction position storages, wherein each of said instruction position storages is configured to store a different one of said plurality of instruction identifiers corresponding to said plurality of instructions.

4. The instruction alignment unit as recited in claim 3 wherein said second control unit is configured to maintain said plurality of instructions within said plurality of instruction position storages in program order, whereby a first one of said plurality of instruction position storages stores a first one of said plurality of instruction identifiers corresponding to a first instruction which is prior to a second instruction in program order and said second instruction corresponds to a second one of said plurality of instruction identifiers stored in a second one of said plurality of instruction position storages.

5. The instruction alignment unit as recited in claim 4 wherein, if said first instruction is selected for dispatch and said second instruction is not selected for dispatch, said second control unit is configured to shift said second one of said plurality of instruction identifiers from said second one of said plurality of instruction position storages to said first one of said plurality of instruction position storages.

6. The instruction alignment unit as recited in claim 5 wherein said second instruction queue further comprises a plurality of instruction bytes storages, wherein said plurality of instruction bytes storages is configured to store instruction bytes which include said plurality of instructions.

7. The instruction alignment unit as recited in claim 6 wherein said first control unit is further configured to select said number of said plurality of instructions based upon a number of instruction bytes stored within said plurality of instruction bytes storages.

8. The instruction alignment unit as recited in claim 6 wherein each one of said plurality of instruction position storages is configured to store a start block value which identifies which one of said plurality of instruction byte positions is storing a start byte of said different one of said plurality of instructions.

9. The instruction alignment unit as recited in claim 8 wherein each one of said plurality of instruction position storages is configured to store an end block value which identifies which one of said plurality of instruction byte positions is storing an end byte of said different one of said plurality of instructions.

10. The instruction alignment unit as recited in claim 1 wherein said first instruction queue comprises a plurality of subqueues, wherein each one of said plurality of subqueues is configured to store a different one of said plurality of instruction blocks.

11. The instruction alignment unit as recited in claim 10 wherein said first control unit is configured to manage said plurality of instruction blocks within said plurality of subqueues such that a first one of said plurality of subqueues stores a first one of said plurality of instruction blocks which is prior to a second one of said plurality of instruction blocks stored in a second one of said plurality of subqueues in program order.

12. The instruction alignment unit as recited in claim 11 wherein, if said first one of said plurality of instruction blocks is exhausted and said second one of said plurality of instruction blocks is not exhausted, said first control unit is configured to shift said second one of said plurality of instruction blocks into said first one of said plurality of subqueues.

13. A method for aligning instructions from an instruction cache to a plurality of decode units in a superscalar microprocessor comprising:

receiving a plurality of instruction blocks from said instruction cache into a first instruction queue;

selecting a plurality of instructions from said plurality of instruction blocks;

storing said plurality of instructions into a second instruction queue; and selecting one or more instructions from said second instruction queue for dispatch to said plurality of decode units.

14. The method as recited in claim 13 wherein said first instruction queue comprises a plurality of subqueues, wherein each one of said plurality of subqueues is configured to store a different one of said plurality of instruction blocks.

15. The method as recited in claim 13 wherein said second instruction queue comprises a plurality of instruction position storages, wherein each one of said plurality of instruction position storages is configured to identify a different once of said plurality of instructions.

16. The method as recited in claim 15 wherein said second instruction queue further comprises a plurality of instruction bytes storages, wherein said plurality of instruction bytes storages is configured to store a plurality of instruction bytes including said plurality of instructions.

17. The method as recited in claim 13 wherein said selecting one or more instructions is based upon a predefined set of criteria.

18. The method as recited in claim 17 wherein said predefined set of criteria includes a criterion that at most one predicted taken branch instruction is included within said one or more instructions.

19. The method as recited in claim 17 wherein said predefined set of criteria includes a criterion that at most one microcode instruction is included within said one or more instructions.

20. The method as recited in claim 17 wherein said predefined set of criteria includes a criterion that at most one non-microcode instruction is included within said one or more instructions if a microcode instruction is also included within said one or more instructions.

21. A superscalar microprocessor comprising:

an instruction cache configured to store instructions, wherein said instruction cache is further configured to provide a plurality of instruction blocks in response to instruction fetching;

an instruction alignment unit coupled to said instruction cache to receive said plurality of instruction blocks, wherein said instruction alignment unit is configured to store said plurality of instruction blocks into a first instruction queue, and wherein said instruction alignment unit is configured to select a plurality of instructions from instruction blocks stored in said first instruction queue, and wherein said instruction alignment unit is configured to store said plurality of instructions in a second instruction queue, and wherein said instruction alignment unit is configured to select one or more instructions from said plurality of instructions stored in said second instruction queue for dispatch based upon a predefined selection criteria; and a plurality of decode units coupled to receive said one or more instructions from said instruction alignment unit, wherein each one of said plurality of decode units is configured to receive a different one of said one or more instructions and to decode said different one of said one or more instructions.

* * * * *